United States Patent [19]

Wilding

[11] Patent Number: 5,575,104
[45] Date of Patent: Nov. 19, 1996

[54] FISHING LINE ACCESSORY

[76] Inventor: John Wilding, The Boat House, Halton-on-Lune, Nr. Lancaster, United Kingdom, LA2 6LR

[21] Appl. No.: 237,824

[22] Filed: May 4, 1994

[30] Foreign Application Priority Data

Dec. 4, 1993 [GB] United Kingdom ............... 9324924

[51] Int. Cl.$^6$ .................................................. A01K 87/00
[52] U.S. Cl. .......................... 43/25.2; 43/57.1; 43/42.31; 206/315.11; 220/4.25
[58] Field of Search .................... 43/57.1, 25.2, 43/44.9, 44.87, 44.89, 44.92, 42.31, 43.14, 44.4, 44.2; 206/315.11; 220/4.24, 4.25, 23.2, 23.8; 229/406, 407

[56] References Cited

U.S. PATENT DOCUMENTS

| | | | |
|---|---|---|---|
| 1,240,043 | 9/1917 | Gregory | 43/44.92 |
| 1,938,931 | 12/1933 | Newman | 43/57.1 |
| 3,107,451 | 10/1963 | Sitzler | 43/44.87 |
| 3,322,267 | 5/1967 | Weiss | 229/406 |
| 3,999,661 | 12/1976 | Jones | 229/406 |
| 4,244,470 | 1/1981 | Burnham | 220/4.25 |
| 4,441,274 | 4/1984 | Masur | 43/25.2 |
| 4,561,205 | 12/1985 | Kessler | 43/44.87 |
| 4,863,054 | 9/1989 | Capelta | 220/4.23 |
| 4,893,433 | 1/1990 | Scheffler | 43/44.92 |
| 5,123,199 | 6/1992 | Lysohir | 43/57.1 |
| 5,259,151 | 11/1993 | Wicht | 43/42.31 |

FOREIGN PATENT DOCUMENTS 1278149 10/1961 France ............................. 220/23.8

Primary Examiner—Joseph J. Hail, III
Assistant Examiner—James Miner
Attorney, Agent, or Firm—Howell & Haferkamp, L.C.

[57] ABSTRACT

A fishing line accessory comprises at least two partial housing parts which are adapted to be mated together to form a hollow housing. The housing receives a rattle member and means is provided by which the accessory can be received on a fishing line. More particularly a member is moulded from plastics with two partial housings connected by a web. One partial housing carries projection means and the other carries complimentary housing means. There is relieving in the connecting web. In one embodiment, the relieving corresponds with a line of weakness permitting hinging together of the two partial housings to form a single hollow housing. The relieving forms a recess to accommodate the fishing line. In another embodiment two of said members are engaged together to form two hollow housings and the relieving in the respective webs form a recess to receive the line.

31 Claims, 2 Drawing Sheets

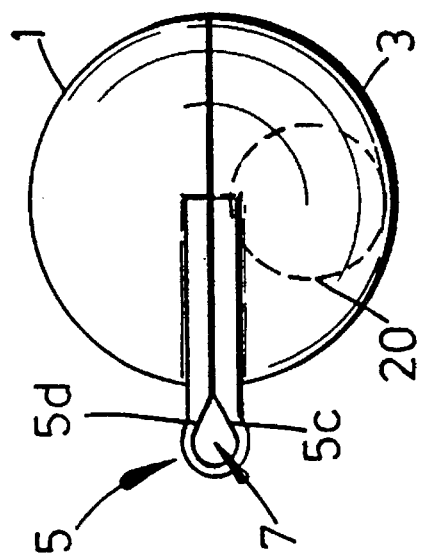
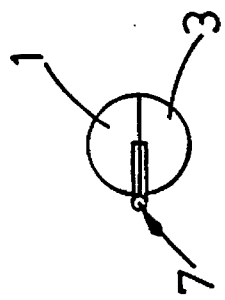
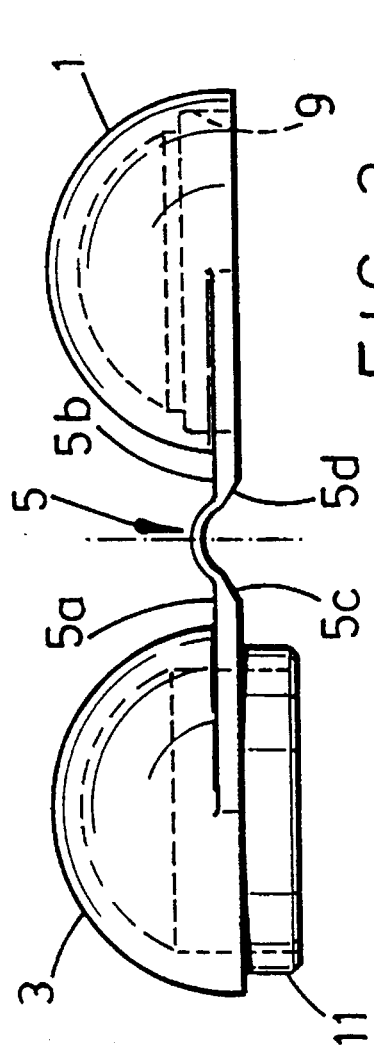
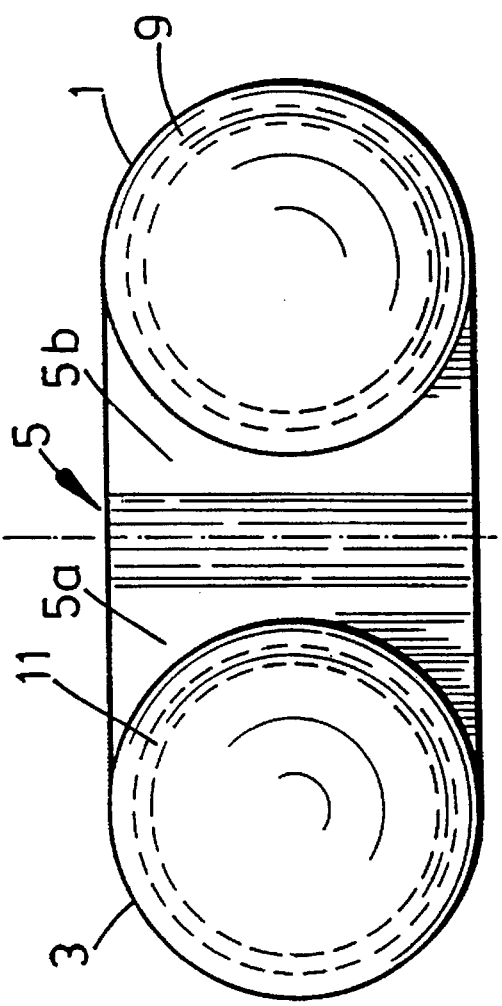

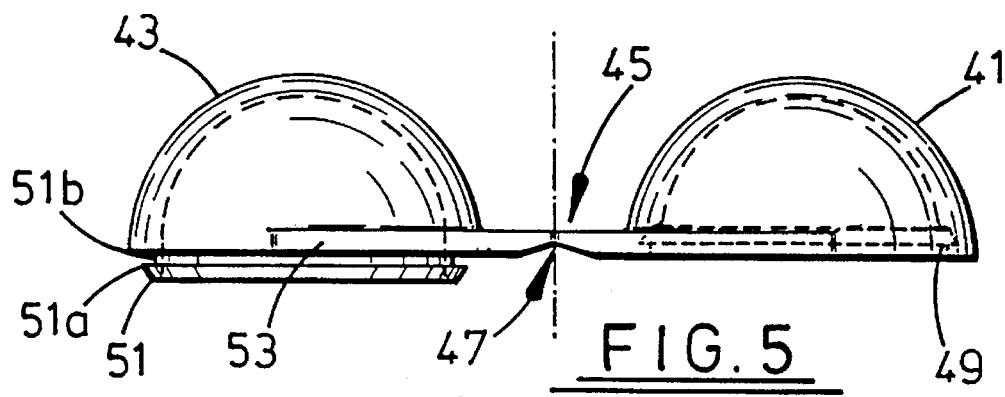
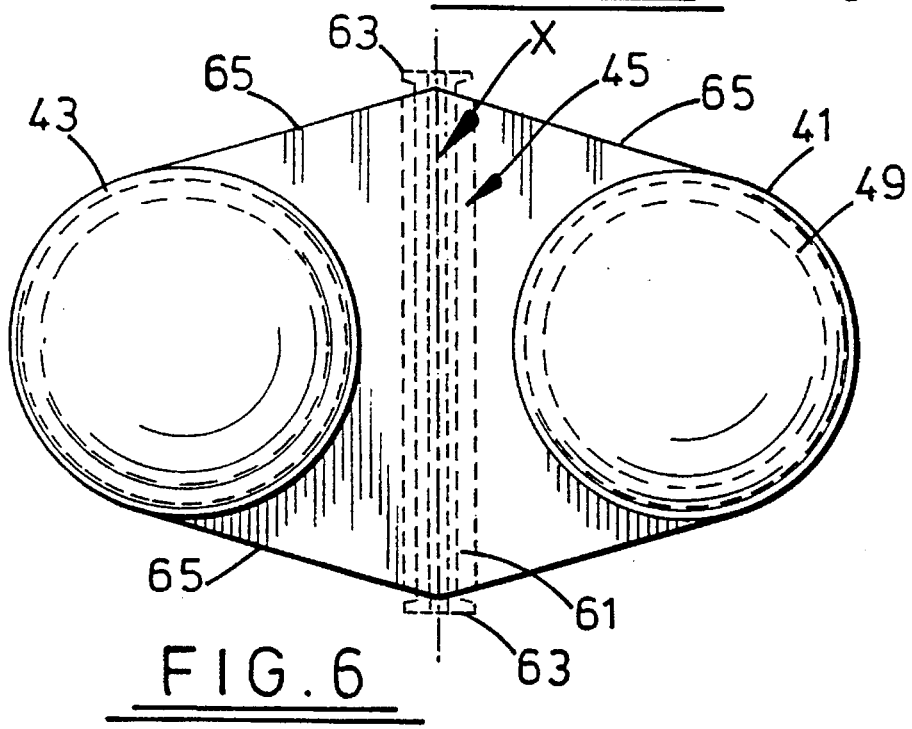
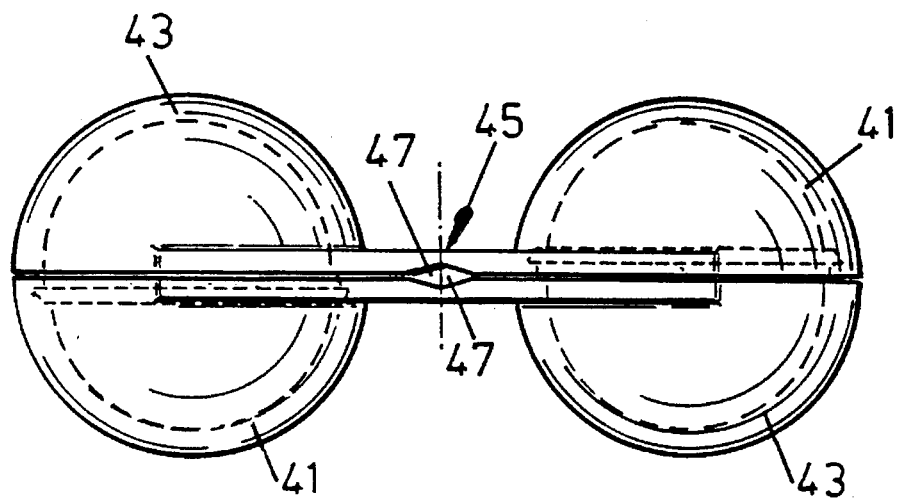

FISHING LINE ACCESSORY

The present invention relates to a fishing line accessory and in particular to improvements in and relating to fishing beads.

In fishing using rod and line, particulary but not exclusively sea fishing, beads are threaded onto the line to serve as a visual attraction (by virtue of their colour) and/or to generate vibrations (for example in the nature of a rattle), as well as for other purposes. Several beads may be threaded onto a line some distance from the location of the hook and bait in a manner which enables them to shuttle along the line between stops. Theoretically, movement of the beads along the line between these stops generates vibration which attracts the fish although in practice the beads may not move unless there are strong currents. Also threading the beads onto the line is time consuming.

The present invention aims to provide an improved fishing bead.

Accordingly, the present invention provides a fishing line accessory comprising two interconnected partial housings, conveniently made from a moulded member, the two interconnected partial housings carry means by which they are connectable either together one with the other to form a single hollow housing or with the partial housings of another said moulded member to form two hollow housings, the hollow housing being adapted to receive a rattle member with freedom to move within the hollow housing and wherein means is provided by which the accessory is received on a fishing line.

The means by which the two partial housings are connected together comprises projection and recess means. More particularly, one carries projection means and the other has corresponding recessing to receive the projection means. More particularly the projection and recess means provides a snap-fit connection using a barb-like rib and corresponding recess.

Accordingly one embodiment of the fishing line accessory comprises two mutually engageable members which when coupled together provide two hollow housings to receive a respective rattle member which has freedom to move within its hollow housing, and wherein coupling together of the members defines a recess which receives a fishing line with the two hollow housings disposed to opposite sides of the line.

Conveniently the two mutually engageable members are constructed identically, each having two interconnected partial housings. More conveniently the members fit together in a snap-fitting manner. It is particularly convenient for the hollow housing to be made up of two partial housings having male and female connecting parts, for example, mutually complimentary projection and recess means to provide said snap-fitting engagement of the two parts. In a preferred embodiment the hollow housings are generally spherical and made up of two hemispherical portions. Preferably one housing has an annular projection to the mouth thereof carrying a circumferential rib having a tapered lead and terminated by a radial face, whilst the other partial housing has a groove surrounding the mouth thereof to receive said annular projection. Conveniently each part is formed with recessing intermediate the partial housings and the recessing is formed by relieving of a connecting web. Advantageously the relieving defines a line of weakness which in another embodiment serves as a hinge line to facilitate connection of one partial housing with the other.

Accordingly, another embodiment of the present invention provides a fishing line accessory comprising a hollow housing constructed in two parts connected by a hinge means to permit movement between an open position to receive a rattle member, and a closed position enclosing the rattle member with freedom to move within the hollow housing, and wherein hinging together of the two parts forms an open ended bore to receive a fishing line.

It is preferred that the accessory be formed as a moulding from plastics material, and polypropylene is deemed particularly suitable insofar as it is readily suited as a hinge thus the two parts of the hollow housing and the hinge means connecting them can be formed integrally (eg. as a moulding) from one material. An advantage of having the open ended bore formed when the two parts are hinged together is that the accessory can be folded around the line thereby avoiding the need for threading the accessory onto a line. By this means the accessory can be placed on the line when the presence of a hook or other accessory would prevent threading on of the traditional bead.

The hollow housing may be any desired shape although the stream-lined shape of a sphere is preferred and conveniently each of the parts is constructed as a hollow hemispherical moulding. The accessory can be made in any desired colour and a selection of colours is preferred. The colouring serves as a visual attraction. Advantageously, to avoid snagging of the line in use, the connecting web is widest at the line of the relieving/hinge axis, and slopes downwardly and outwardly to the periphery of the housing parts.

The rattle member may be made from the same type of material as the accessory or it may be a different type of material. It may comprise a small bead, steel ball, glass ball or piece of lead shot. Conveniently it is of size and shape to be able to move around within the hollow housing and the type of material chosen to produce the desired sound. Conveniently, the rattle member is spherical.

The present invention will now be described further, by way of example only, with reference to the accompany drawings, in which:

FIG. 1 is an end view of the line accessory in a closed position shown to an enlarged scale, FIG. 2 is an end view of the accessory (also to an enlarged scale) in an open position, FIG. 3 is a view in the direction of arrow A of FIG. 2, FIG. 4 is the corresponding view to FIG. 1 but showing the accessory in a more typical size, FIGS. 5 and 6 are a side view and a plan view respectively of a line accessory according to another embodiment, and FIG. 7 is a side view of fishing line accessory assembled from two of the members illustrated in FIGS. 5 and 6.

Referring to the drawings, a fishing line accessory according to a first embodiment comprises two housing parts 1, 3 which in the illustrated embodiment are hollow hemispherical members. The two parts are connected by hinge means 5 including respective connecting webs 5a, 5b connecting with the respective housing parts. The section of material of the connecting parts 5a, 5b is relieved towards the hinge means and in the illustrated embodiment has tapered faces 5c, 5d. The effect of this is that on hinging of the two parts together a through hole or slot 7 is formed which serves to receive the fishing line. Hemispherical part 1 has an annular recess 9 which receives an annular projection 11 of hemispherical part 3 which when engaged hold the two parts together.

It is proposed to mould the housing parts of the line accessory in their open position as shown in FIGS. 2 and 3 and it is further envisaged that a plurality of such housing parts will be formed on a corner in a manner which enables them to be broken off when required for use. The rattle member may comprise a spherical member such as illustrated in dotted outline at 20 in FIG. 1 signifying that it is enclosed within the hollow housing and has freedom to move within the housing where these are of the same material as the housing parts they may be moulded as part of the carrier to be broken off for insertion in the housing part before closure thereof. In the illustrated embodiment the rattle member is approximately one quarter of the size of the housing. Conveniently the accessory is referred to as a bubble rattle or bubble bead.

Referring now to FIGS. 5 and 6 there is illustrated an alternative configuration of moulded component which is developed from the embodiment illustrated in FIGS. 2 and 3. It comprises two hemispherical parts 41, 43 connected by a bridge member 45. The bridge member is reduced in thickness to define a groove 47. The opening to the first hemispherical part 41 has a circumferential groove 49 to receive an annular rib 51 of a projection 53 of the hemispherical part 43. The rib comprises a leading tapered face 51a terminated by a substantially perpendicular radial face 51b. The circumferential groove 49 corresponds in shape to the rib 51.

The thickness of the bridge member is reduced by the groove such that the connecting member may hinge along axis X where the moulded member is to be formed into a single hollow housing in the manner of the first embodiment. The above described projection and recess means facilitate snap-fitting together of the two hemispherical parts. A rattle member, not illustrated, would be received in the resulting housing part.

According to an alternative embodiment two of the moulded members illustrated in FIGS. 5 and 6 are engaged one with the other by way of the complimentary projection and recess parts to form a double-hollow housing as illustrated in FIG. 7. Each hollow housing will again hold a rattle member, not illustrated, which is free to move within the respective hollow housing. In such an arrangement the recessing 47 forms a through bore in the connecting web and this receives a fishing line. Thus the accessory can be snap-fitted onto a fishing line. The resulting accessory with the twin housing is found to spin on the fishing line thus attracting attention of the fish.

Where a particularly thin line is employed it may be desirable to introduce a sleeve into the through bore defined by the grooves 47 and such a sleeve may be in the form of a hollow bobbin 61 with flanged ends 63 to retain it longitudinally. The fishing line can be threaded through the bobbin either before or after assembly with the housing members.

An advantageous feature of the illustrated embodiment is the edges 65 which slope down from the widthwise extremity of the line recess/hinge 47 towards the periphery of the housing parts 41, 43, actually as a tangent therefrom in the illustrated embodiment. This is advantageous to avoid line snagging in use as the slope causes the line to slide off.

It will be understood that the embodiment illustrated in FIGS. 2 and 3 could also be coupled together in a manner described with reference to FIGS. 5 and 6 to form a twin housing accessory.

What I claim is:

1. A submarine fishing line accessory to be mounted movably on a fishing line to be submersed, in use, to attract fish comprising a member having two partial housings interconnected by a connecting web, means by which the two partial housings are connectable one with the other to form a single hollow housing, the hollow housing having a completely enclosed interior volume being adapted to receive a rattle member with freedom to move within the hollow housing, and wherein at least one recess is provided in the connecting web to receive the fishing line and by which the accessory is received slidably and rotatably movably on the fishing line, the connecting web between the two partial housings permitting hinging to bring the two partial housings into mutual engagement to form the single hollow housing such that the at least one recess forms an open-ended bore within the connecting web to receive the fishing line when the two partial housings are in mutual engagement, the bore being disposed to one side of the single hollow housing.

2. An accessory according to claim 1, in which the means by which-the two partial housings are connected together comprising projection and recess means.

3. An accessory according to claim 2, in which one partial housing carries projection means and the other carries recess means to receive the projection means.

4. An accessory according to claim 2, in which the projection and recess means provides a snap-fit connection using a rib and complimentary recess.

5. An accessory according to claim 1, in which the connecting web is widest at the line of weakness and slopes down to the periphery of the housing parts.

6. An accessory according to claim 1, in which the member is moulded from plastics material.

7. An accessory according to claim 1, in which the partial housings are generally hemispherical.

8. An accessory according to claim 1, in which the material for the rattle member is selected from plastics, glass, steel or lead and is of a size to be able to move around within the hollow housing.

9. An accessory according to claim 8, in which the rattle member is spherical.

10. An accessory according to claim 1 in which bringing together of the two interconnected partial housings forms a single hollow housing which is generally spherical.

11. An accessory according to claim 1 in which bringing together of the two interconnected partial housings serves to create the line of relieving which, in use, receives the fishing line.

12. An accessory according to claim 1, wherein the connecting web is configured to permit the hinging to take place along a hinge axis across the connecting web.

13. An accessory according to claim 12, wherein the open-ended bore is parallel to the hinge axis.

14. An accessory according to claim 13, wherein a single recess along the hinge axis is the sole recess in the connecting web.

15. A submarine fishing line accessory to be mounted movably on a fishing line to be submersed, in use, to attract fish comprising two members each having two interconnected partial housings, a connecting web serves to connect the two partial housings of each member, means by which said two members are connectable together to form two hollow housings, at least one of the hollow housings being adapted to receive a rattle member with freedom to move within the hollow housing, and wherein a line of relieving is provided to receive the fishing line and by which the accessory is received slidably and rotatably movably on the fishing line wherein coupling together of said two members defines a passageway constituting said line of relieving which receives the fishing line and wherein the two hollow housings are disposed to opposite sides of the line.

16. An accessory according to claim 15, further comprising a rattle member for each hollow housing.

17. An accessory according to claim 15, in which the material for the rattle member is selected from plastics, glass, steel or lead and is of a size to be able to move around within the hollow housing.

18. An accessory according to claim 17, in which the rattle member is spherical.

19. An accessory according to claim 15, in which the two members are moulded from a plastics material.

20. An accessory according to claim 15, in which the partial housings are hemispherical.

21. An accessory according to claim 15, in which the two members may be the same or different colours.

22. An accessory according to claim 15, in which the connecting web is relieved to form at least in part said passageway.

23. An accessory according to claim 22, in which the relieving forms a line of weakness.

24. An accessory according to claim 22 further comprises a hollow sleeve with flanged ends which is received in said passageway and the fishing line passes through its hollow base.

25. An accessory according to claim 15, in which the connecting web is widest where the line is received and opposite edges slope inwardly down to the periphery of the housing parts.

26. An accessory according to claim 15, in which bringing together of the two members forms two hollow housings each of which is generally spherical.

27. An accessory according to claim 15, in which the line of relieving is disposed in a plane which passes through the middle of the two hollow housings.

28. An accessory according to claim 15, in which the two members are constructed identically.

29. An accessory according to claim 15, in which the means by which the two members are connected together comprises projection or recess means.

30. An accessory according to claim 29, in which each of said two members has one partial housing which carries projection means and its other partial housing which carries recess means, whereby the projection and recess means of one member make connection with the recess and projection means of the other member.

31. An accessory according to claim 30, in which the respective projection and recess means provide a snap-fit connection using a rib and a complimentary recess.

* * * * *